R. WHITE.
MEANS FOR GREASING SPRINGS.
APPLICATION FILED APR. 20, 1920.

1,378,159.

Patented May 17, 1921.

Inventor.
Robert White
by H. J. S. Dennison
atty.

UNITED STATES PATENT OFFICE.

ROBERT WHITE, OF ORILLIA, ONTARIO, CANADA, ASSIGNOR OF ONE-HALF TO MELVILLE B. TUDHOPE, OF ORILLIA, ONTARIO, CANADA.

MEANS FOR GREASING SPRINGS.

1,378,159.      Specification of Letters Patent.      Patented May 17, 1921.

Application filed April 20, 1920. Serial No. 375,220.

*To all whom it may concern:*

Be it known that I, ROBERT WHITE, a subject of the King of Great Britain, and resident of Orillia, in the Province of Ontario, in the Dominion of Canada, have invented certain new and useful Improvements in Means for Greasing Springs, described in the following specification and illustrated in the accompanying drawings, that form part of the same.

The objects of this invention are to obviate the disagreeable conditions met with in greasing automobile or carriage springs and to devise a simple and effective method of applying the grease between the spring leaves so as to insure thorough and even distribution over the surfaces without the unsightly and detrimental condition of the grease overflowing.

The principal feature of the invention consists in placing a layer of grease between a pair of perforated strips which are adapted to be inserted between the spring leaves.

Figure 1:
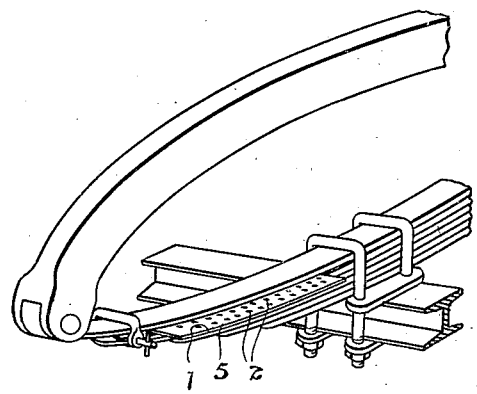

In the drawings, Figure 1 is a perspective view illustrating the manner of placing my improved greasing device between the spring leaves.

Figure 2:
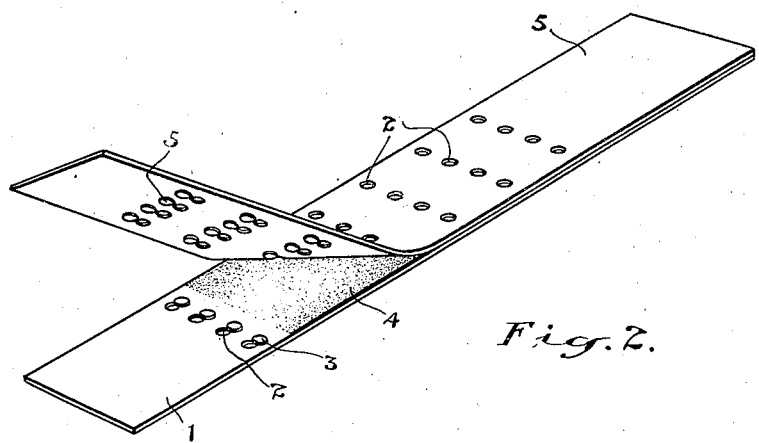

Fig. 2 is an enlarged perspective detail of a portion of a strip of my greasing material.

It is well known that the lubrication of the leaves of the springs of vehicles is very badly neglected and that grease when placed between the leaves is subjected to the rubbing action of the flexing of the spring and is rapidly pressed outwardly and with the heat in summer weather the springs soon become dry. The greasing of the spring leaves is a difficult and dirty operation which is therefore avoided as much as possible.

With my improved device the work of greasing the springs becomes simplified and it is merely necessary to spread the leaves of the springs apart and insert a length of my prepared material and the work of greasing is completed.

In my improved method of greasing the springs, I prepare a strip of paper 1, which is preferably of a thin and tough nature, by perforating transverse rows of holes 2 therein. In forming the perforations, only a portion of the material is cut and the partly separated tabs 3 are turned back and lie against the paper strip. A coating 4 of grease is then spread over the strip on the side to which the tabs 3 are turned. A second strip 5, perforated in a similar manner to the strip 1 is then laid upon the greased strip, the tabs turned inward and arranged in offset relation to the tabs of the other strip.

The holes are thus arranged in offset relation and the tabs act as separators allowing the grease to flow to the holes in both strips even when heavy pressure is applied.

When the spring leaves are separated, this composite strip is inserted between them and when the separating pressure is released the spring pressure squeezing the strip squeezes the grease out through the perforations, thus distributing the lubricant uniformly over the surface of the metal both on the top and bottom and the paper strips prevent the grease from spreading laterally and overflowing around the side edges of the spring.

The paper eventually becomes softened with the grease and the working of the spring leaves the one upon the other disintegrates the paper and forces it out leaving the spring surfaces covered with a thin and uniform coating of lubricant which insures smoothness of operation and eliminates wear and consequent squeaking caused by friction of the leaves.

The invention described is extremely simple. It insures the thorough distribution of the grease over the spring surfaces and prevents waste of grease and also enables the work being accomplished very expeditiously.

What I claim as my invention is:—

1. A means for greasing springs, comprising, two strips of perforated material arranged with the perforations of one strip offset in respect to the perforations of the other strip, and a layer of grease between said strip, said composite strip adapted to be placed between the spring leaves.

2. A means for greasing springs, comprising, a pair of strips of thin material having rows of tabs partly separated therefrom and turned back from the perforations to form spacing members, said tabs being arranged on the adjacent sides of the strips, and a layer of grease placed between said strips.

3. A means for greasing springs, comprising, a pair of paper strips, each being perforated with transverse rows of holes, a layer of grease placed between said strips and adapted to be extruded through the holes, said strips being placed between the leaves of the spring.

ROBERT WHITE.

Witnesses:
M. B. TUDHOPE,
CLIFFORD WHITE.